Patented June 10, 1947

2,422,166

UNITED STATES PATENT OFFICE 2,422,166

PROCESS OF PRODUCING AROMATIC COMPOUNDS

James Kenneth Dixon, Riverside, and Donald R. May, Stamford, Conn., assignors to American Cyanamid Company, New York, N. Y., a corporation of Maine No Drawing. Application August 21, 1945, Serial No. 611,923

13 Claims. (Cl. 260—668)

This invention relates to the production of aryl compounds having at least one aliphatic nuclear substituent which contains a carbon-to-carbon double bond and more particularly, to the production of such aryl compounds which have a vinyl group attached to an aryl nucleus.

The patent of Murray Gray Sturrock and Thomas Lawe, No. 2,373,982 which issued April 17, 1945, discloses a method of producing styrenes and other aryl compounds made in accordance with the present invention and this patent deals with the use of siliceous catalysts and more particularly, hydrated aluminum silicates.

An object of the present invention is to provide catalysts which are effective for the conversion of diaryl substituted paraffins, having at least two carbon atoms in the paraffin chain and having the aryl groups attached to the same carbon atom, into aromatic compounds including one which has an aliphatic nuclear substituent containing a carbon-to-carbon double bond.

Another object of the present invention is to provide a non-siliceous catalyst for the conversion of diaryl paraffins of the aforementioned type and the like into other aromatic compounds including aryl compounds having a nuclear substituent containing a carbon-to-carbon double bond.

These and other objects are attained by employing a zirconium dioxide catalyst for the aforementioned type of reaction. Thus our process contemplates contacting a vapor comprising a compound of the class consisting of diaryl substituted paraffins having at least two carbon atoms in the paraffin chain and having the aryl groups attached to the same carbon atom in the paraffin chain, and their nuclear substituted derivatives with a catalyst comprising zirconium dioxide alone or with other metal oxides at a temperature of at least 350° C. and preferably at a temperature of about 500°–600° C. It is also preferable that the contact time be less than 0.4 second and in order to avoid practical difficulties it is generally desirable to employ a contact time of about 0.001 second or more. Still another preferable feature of our process is the use of a diluent in relatively high proportions, namely, from about 5 to 150 or more mols of diluent per mol of diaryl aliphatic compounds. Water vapor is one of the most desirable diluents since it may be easily condensed, and thereby separated from the final product.

The following examples in which the proportions are in parts by weight are given by way of illustration and not in limitation, the ditolylethane employed in the following examples is 1,1-di-p-tolylethane.

Example 1

About 250 parts of a zirconium oxide catalyst (catalyst "A") are packed into a tube which is heated and maintained at a temperature between about 500° C. and about 550° C. Ditolylethane is mixed with water vapor and passed through the tube at the rate of about 360 parts per hour and water vapor is mixed therewith and fed at the rate of about 2960 parts per hour. A total of 970 parts of ditolylethane is passed through the tube and about 930 parts of condensed oil are recovered. The condensate is distilled to yield about 104 parts of a light oil boiling below 200° C., 810 parts of hydrocarbons boiling at about the boiling point of ditolylethane and containing the unchanged ditolylethane together with small quantities of other substances such as asymmetric ditolylethylene leaving a residue of high boiling material amounting to about 13 parts.

The light oil is titrated with a potassium bromide-bromate solution and the proportion of p-methylstyrene in the light oil is calculated from the results of this titration (assuming the unsaturated content is all p-methylstyrene). Since it is theoretically possible to have only about 56.2% of p-methylstyrene in the light oil the percentage of p-methylstyrene found by the above analysis when subtracted from 56.2 gives the percentage of p-ethyltoluene in the light oil. The remainder of the light oil is assumed to be toluene. The foregoing method of analysis and calculations have been found to be accurate when checked by the results obtained by fractionation of the light oil, by infra-red and other spectroscopic analyses thereof. Using the foregoing method of analysis the light oil obtained in accordance with this example contains about 46 parts of p-methylstyrene, 12 parts of p-ethyltoluene and 46 parts of toluene.

The p-methystyrene, the toluene and the ethyltoluene may each be separated from the light oil by fractionation. The ethyltoluene may be dehydrogenated to form p-methylstyrene. The unreacted ditolylethane may be recycled through the reaction tube in the same manner as described above in connection with the original pass of the ditolylethane. By recirculating the unchanged ditolylethane, a high yield of p-methylstyrene is obtainable in accordance with our process. If the unchanged ditolylethane contains sufficient 1,1-di-p-tolylethylene to warrant separation this may be done by fractionation, by fractional crystallization or both fractionation and fractional crystallization, or by any other suitable means and the ditolylethylene thus obtained may be used for polymerization reactions while the purified ditolylethane is recycled to form additional quantities of p-methylstyrene.

*Example 2*

The procedure of Example 1 is followed substituting 150 parts of a zirconium oxide-aluminum oxide catalyst (catalyst "B"). About 970 parts of ditolylethane are passed through the reaction tube packed with the aforementioned catalyst along with water vapor at the rate of about 331 parts per hour of ditolylethane and at the rate of about 2420 parts per hour of water. About 960 parts of hydrocarbon condensate are obtained and upon fractionation a light oil boiling below about 200° C. amounting to about 300 parts is separated. About 650 parts of a hydrocarbon fraction boiling at about the boiling point of ditolylethane and containing the unchanged ditolylethane, together with small amounts of other hydrocarbons such as di-p-tolylethylene are recovered from the condensate leaving about 10 parts of a high boiling residue. The light oil contains about 144 parts of p-methylstyrene, 23 parts of p-ethyltoluene and 173 parts of toluene, using the method of analysis described in Example 1. The light oil may be separated into its constituents by any desired method such as fractionation.

*Preparation of catalyst "A"*

A catalyst of this type is prepared by dissolving the equivalent of 290 parts of zirconium sulfate tetrahydrate in about 3 liters of water and adding 2N ammonium hydroxide solution with vigorous agitation until the pH is about 7 thereby precipitating a gel which may be washed as by decantation several or more times. The gel is centrifuged to remove most of the water and then partially dried for a few hours at 110° C. The temperature is then gradually increased over a period of about 20 hours to 650° C. and maintained at that temperature for about 4 hours.

*Preparation of catalyst "B"*

The zirconium oxide gel is prepared and washed as in the preparation of catalyst "A" and the gel is then suspended in water after which the pH thereof is lowered to about 3 by the addition of nitric acid. About 28 parts of aluminum chloride dissolved in water are added to the suspension and thereafter 2N ammonium hydroxide solution is added with vigorous agitation until the pH is about 7 thereby precipitating a gel which is washed three or more times as by decantation. The gel is centrifuged, dried and heated to about 650° C. as described in the connection with the preparation of catalyst "A." It will be observed that catalyst "B" contains about 10% of $Al_2O_3$. In addition to the zirconium oxide catalyst mentioned above other catalysts comprising zirconium oxide in substantial proportions may be employed. It is preferable that the zirconium oxide be present in a proportion at least as great as 3% of the total weight of the catalyst and for most purposes it is desirable that the zirconium oxide constitute a major proportion of the catalyst. One or more other oxides may be mixed with the zirconium oxide and, for example, a catalyst may be used containing a mixture of several oxides, such as a mixture of zirconium oxide, aluminum oxide and cerium oxide, as well as catalysts containing zirconium oxide along with one other oxide as illustrated in catalyst "B." Other examples of oxides which may be mixed with or coprecipitated with zirconium oxide are the solid oxides of the elements of group IV of the periodic system. Examples of such catalysts include zirconium oxide-stannic oxide catalyst, zirconium oxide-titanium dioxide catalyst, zirconium oxide-cerium oxide-cerium oxide catalysts. In place of the cerium oxide any of the other oxides of any of the rare earth elements or mixtures thereof may be used. The oxides are preferably prepared in the form of gels which may be hydrated to various degrees, in accordance with the known principles.

The zirconium oxide catalysts may include other substances which activate them or other substances which are entirely inert and are used merely to extend the active surface of the zirconium oxide catalysts, or which are used as supports or binders for the catalysts.

Our catalysts may be supported upon finely divided substances such as silicon carbide, nonporous aluminum oxide (such as those materials sold under the trade names "Alfrax," "Alundum," etc.), highly fired ceramic materials in the form of rings, sadddles, grids etc. Binding agents such as sodium silicate may be advantageously used in some cases to improve the mechanical stability of the catalysts.

The present invention does not contemplate the use of zirconium silicates but other silicates such as the hydrated aluminum silicates employed by the patentee of Patent No. 2,373,982 may be admixed with our zirconium oxide catalysts.

Our catalysts are employed in a finely divided condition fashioned into pellets which are preferably no larger than about 5 mm. in their greatest diameter. The pellets may be in any desired shape such as cubical, spherical, or of an irregular granular shape. When large pellets are employed the vapor velocity varies widely between the center and outside of the pellet, and therefore the contact time at the center of the pellet is longer than desirable. It is preferable that the particles be as fine as possible in order to reduce the difference between the maximum and minimum vapor velocities which occur in the catalyst bed. Obviously the particle size should not be so small that the catalyst packs thereby causing the vapors to channel through the catalyst instead of passing therethrough in a uniform manner.

The converter into which the catalyst is packed may be a tube constructed of steel, silica or any other suitable material and in large scale operations the converter may comprise a plurality of such tubes or it may be a shell-type converter having one or more layers or trays of catalyst therein.

A short contact time of the diaryl paraffin with the catalyst is desirable in carrying out the reactions in accordance with this invention. While longer contact times may be used if desired it is generally preferable that the contact time be less than 0.4 second. The contact times between about 0.1 and 0.05 are especially suitable. Generally it is desirable to employ a contact time of 0.001 second or longer, in order to avoid practical difficulties. The calculation of the contact of the vapor with the catalyst is a complex matter, and in order to simplify this calculation we have used the term "contact time" herein to mean those values which are computed on the assumption that the catalyst contains 50% voids and neglecting both the pressure drop through the catalyst and the increase in volume which occurs during the reaction. The contact time employed in the foregoing examples is about 0.1 second.

Inasmuch as the reaction is neither highly exothermic nor endothermic it is not necessary to supply much more heat than that necessary to compensate for conduction and radiation losses in order to maintain the reaction temperature of the vapors passing through the catalyst, providing that the vapors which are fed to the catalyst are pre-heated to about the desired reaction temperature and providing a high ratio of diluent to the diaryl paraffin is employed. We therefore prefer that the vapors fed to the catalyst be preheated to the reaction temperature. Any suitable method of heating the converter may be employed such as, for example, electrical resistance heaters.

The following are illustrative of the aliphatic compounds having two aryl substituents attached to the same carbon atom thereof which may be converted into the mononuclear aromatic compounds in accordance with the present invention: 1,1-diphenylethane, each of the 1-phenyl-1-tolylethanes, each of the 1,1-ditolylethanes, each of the 1-phenyl-1-xylylethanes, each of the 1-tolyl-1-xylylethanes, each of the 1,1-dixylylethanes, 1,1-diphenylpropane, each of the 1-phenyl-1-tolylpropanes, each of the 1,1-ditolylpropanes, each of the 1-tolyl-1-xylylpropanes, each of the 2,2-ditolylpropanes, each of the 1,1-di-(monochlorophenol)-ethanes, each of the 1,1-di-(dichlorophenyl)-ethanes, each of the 1,1-di-(monohydroxy phenyl)-ethanes, each of the 1,1-dicresylethanes, each of the 2,2-dicresylpropanes, each of the 1,1-dinaphthylethanes, each of the 1,1-dixenylethanes, each of the 1-tolyl-1-naphthylethanes, and the like and their nuclear substituted halogen, hydroxyl and other derivatives all of which are volatile at the temperature and pressure used in the process. Those substances containing tolyl, xylyl, cresyl, xenyl, monochlorophenyl and dichlorophenyl groups may be attached to the carbon atom of the paraffin chain at the ortho, meta or para positions and when two of these groups are present they may be attached in the same or different positions.

The reaction temperature may be varied from about 350° C., up to about 600° C. or even higher in some cases. Temperatures above 600° C., cause some pyrolysis loss but on the other hand some of the diaryl paraffins are not easily decomposed at lower temperatures. It is particularly important to employ a short time of contact when temperatures in the neighborhood of 600° C. are used in order to avoid an undesired amount of pyrolysis loss due to side-reactions. Among such side-reactions are those which lead to the formation of polynuclear compounds including anthracene derivatives.

One of the advantages of employing a short contact time with catalysts is that the life thereof is prolonged. With contact times of the order of one second or more the catalyst may become fouled in a relatively short period of time due to the deposition of carbonaceous materials on the surface of the catalyst. When it is necessary or desirable to reactivate the catalyst this may be done by passing heated air, preferably mixed with steam or carbon dioxide, through the catalyst. The temperature of the air and steam mixture should be raised to about 500°–650° C. The air enables the carbon to burn whereas the steam or carbon dioxide which is used in conjunction with the air keeps the temperature from rising too high which might cause a reduction in the activity in the catalyst. Generally, at temperatures of about 500° C. the carbon begins to burn off and the heat of this reaction causes the temperature to rise to about 650° C. without the application of any external heat.

It may be seen that the proximity of the reactivation temperature to the reaction temperature greatly simplifies the change from normal operation to reactivation and back to normal operation. Since the normal highly active life of the catalyst generally exceeds the time required for its reactivation, the operation of two or more converters in parallel is readily accomplished. The short time of reactivation enables one to keep one or more converters in normal operation while one or more other converters are being reactivated.

Any material which is volatile and which does not react with the diaryl substituted paraffin which is to be used in accordance with our process and which does not react with the products formed by the decomposition of the diaryl substituted paraffin may be used as a diluent. Among these, some examples are: water, the hydrocarbons (such as benzene and toluene), the fixed gases (such as nitrogen and carbon dioxide), etc. Water vapor is the preferred diluent inasmuch as it may be readily condensed and therefore separated from the products of the reaction, whereas the fixed gases or the hydrocarbons are somewhat more difficult to separate from the product and such separation requires higher expenditures than are required for the separation of water from the product. Water vapor also has an additional advantage in that it may maintain the catalyst in highly active form.

One of the most important reasons for the use of a diluent is that the time of contact of the diaryl substituted paraffin with the catalyst can be reduced to the desired point easily. It has been found that in order to obtain the short contact times which are desirable in accordance with the present invention the molal ratio of diluent to the diaryl substituted aliphatic compound in the feed to the catalyst is preferably between about 5:1 and 150:1, or more. If the feed can be supplied rapidly to provide a low contact time without the use of the large proportion of diluent the ratio of diluent to the diaryl substituted paraffin may be as low as 1:2.

It has been found that it is frequently desirable to convert only a few percent of the diaryl substituted paraffin fed to the catalyst in one pass but by recovering the unconverted diaryl substituted paraffin and recirculating it from one to five times or more, a high yield is obtained very economically.

Our process may be operated at elevated or reduced pressure and under some conditions it may be particularly advantageous to operate under reduced pressure. If the diaryl substituted paraffin which is to be used in accordance with the present processes is not readily volatile at ordinary pressure, reduced pressures may be used to facilitate the operation of our process.

The present process is a convenient and economical method of converting the diaryl substituted paraffins, having at least two carbon atoms in the paraffin chain and having the two aryl groups attached to the same carbon atom, into other aromatic compounds, one of which contains a side chain having an ethylenic group. The vinyl substituted aryl compounds prepared in accordance with the present invention have wide utility in the production of polymers which in turn are useful for molding, casting, laminating and for many other purposes. Furthermore, pure aryl compounds such as xylene in extremely high purity may be produced simultaneously with the production of the aromatic compound containing an ethylenic side chain. Thus when a diaryl substituted paraffin is cracked in accordance with this invention one molecule of an aryl compound having an ethylenic side chain is obtained together with one molecule of a pure aryl compound which does not have an ethylenic side chain. Such pure aryl compounds, as, for example, pure m-xylene or pure p-xylene, find utility in the synthesis organic compounds where the presence of one or more of the possible isomers is undesired.

Obviously many variations and changes in the compositions, processes and products disclosed herein may be made without departing from the spirit and scope of the invention as defined in the appended claims.

We claim:

1. A process of producing a plurality of aromatic compounds which comprises heating a paraffin having at least two carbon atoms and having two aryl substituents attached to one of said carbon atoms at a temperature which will cause said paraffin to decompose into a plurality of aromatic compounds in the presence of a catalyst and which is at least 350° C. in the presence of a zirconium oxide catalyst.

2. A process of producing a plurality of aromatic compounds which comprises contacting a substance selected from the class consisting of paraffins having at least two carbon atoms in the carbon chain and having two aryl substituents attached to one carbon atom thereof, and their nuclear substituted derivatives, at a temperature which will cause said paraffin to decompose into a plurality of aromatic compounds in the presence of a catalyst and which is at least 350° C. with a zirconium oxide catalyst which promotes simple molecular decomposition into two aromatic compounds.

3. A process of producing a plurality of aromatic compounds which comprises mixing a substance selected from the class consisting of diaryl substituted paraffins having at least two carbon atoms in the paraffin chain and in which both aryl groups are attached to the same carbon atom and their nuclear substituted derivatives with a diluent, contacting the resulting mixture thereof with a zirconium oxide catalyst and maintaining the temperature of said mixture at a temperature which will cause said paraffin to decompose into a plurality of aromatic compounds in the presence of a catalyst and which is at least 350° C. during the time it is in contact with said catalyst.

4. In a method of producing mononuclear aromatic compounds, the steps which comprise heating one of a class of substances consisting of asymmetric diarylethane, the aryl groups of which are mononuclear, and their nuclear substituted derivatives at a temperature which will cause said paraffin to decompose into a plurality of aromatic compounds in the presence of a catalyst and which is at least 350° C. passing the resulting heated substance through a zirconium oxide catalyst which promotes simple molecular decomposition together with a diluent, at such a rate as to provide a contact time with the catalyst of between about 0.001 second and about 0.4 second.

5. A process as in claim 4 wherein said diluent is water vapor.

6. In a method of producing a plurality of aromatic compounds, the steps of which comprise heating a substance of the class consisting of diaryl substituted paraffins at least two carbon atoms in the paraffin chain and having both aryl groups attached to one of the carbon atoms, and their nuclear substituted derivatives, to a temperature which will cause said paraffin to decompose into a plurality of aromatic compounds in the presence of a catalyst and which is at least 350° C. passing said substance through a zirconium oxide catalyst with a contact time of less than 0.4 second.

7. In a method of producing a plurality of aromatic compounds, the step which comprises contacting asymmetric diarylethane with a zirconium oxide catalyst at a temperature which will cause said paraffin to decompose into a plurality of aromatic compounds in the presence of a catalyst and which is at least 350° C. and for a contact time of less than 0.4 second.

8. In a method of producing a plurality of aromatic compounds, the step which comprises contacting an asymmetric ditolylethane with a zirconium oxide catalyst at a temperature which will cause said paraffin to decompose into a plurality of aromatic compounds in the presence of a catalyst and which is at least 350° C. and for a contact time of less than 0.4 second.

9. In a method of producing a plurality of aromatic compounds, the step which comprises contacting a 1,1-di-xylylethane with a zirconium oxide catalyst at a temperature which will cause said paraffin to decompose into a plurality of aromatic compounds in the presence of a catalyst and which is at least 350° C. and for a contact time of less than 0.4 second.

10. A process as in claim 2 wherein the zirconium oxide catalyst is a zirconium oxide aluminum oxide catalyst.

11. In a method of producing a plurality of aromatic compounds, the step which comprises contacting an asymmetric diarylethane with a zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with an alkyl group.

12. In a method of producing a plurality of aromatic compounds, the step which comprises contacting an asymmetric diarylethane with a zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with a hydroxyl group.

13. In a method of producing a plurality of aromatic compounds, the step which comprises contacting an asymmetric diarylethane with a zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with an alkyl group and a hydroxyl group.

JAMES KENNETH DIXON.
DONALD R. MAY.

REFERENCES CITED

The following references are of record in the file of this patent:

UNITED STATES PATENTS

| Number | Name | Date |
|---|---|---|
| 2,373,982 | Sturrock et al. | Apr. 17, 1945 |
| 2,378,904 | Bates | June 26, 1945 |
| 2,223,162 | Benedict | Nov. 26, 1940 |
| 2,282,327 | Dreisbach | May 12, 1942 |
| 2,308,415 | Dreisbach | Jan. 12, 1943 |

OTHER REFERENCES

Scheibley et al., Jour. Am. Chem. Soc., vol. 62, 840-1 (1940), Pat. Office Library.

Certificate of Correction

Patent No. 2,422,166. June 10, 1947.

JAMES KENNETH DIXON ET AL.

It is hereby certified that errors appear in the printed specification of the above number patent requiring correction as follows: Column 3, line 11, before the word "both" insert *by*; column 4, line 18, after the syllable "ide" strike out the hyphen and words "-cerium oxide"; column 6, line 56, after "rapidly" insert *enough*; column 8, line 15, after "paraffins" insert *having*; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.* will cause said paraffin to decompose into a plurality of aromatic compounds in the presence of a catalyst and which is at least 350° C. and for a contact time of less than 0.4 second, said diarylethane having at least one aryl group substituted with an alkyl group and a hydroxyl group.

JAMES KENNETH DIXON.
DONALD R. MAY.

REFERENCES CITED

The following references are of record in the file of this patent:

UNITED STATES PATENTS

| Number | Name | Date |
|---|---|---|
| 2,373,982 | Sturrock et al. | Apr. 17, 1945 |
| 2,378,904 | Bates | June 26, 1945 |
| 2,223,162 | Benedict | Nov. 26, 1940 |
| 2,282,327 | Dreisbach | May 12, 1942 |
| 2,308,415 | Dreisbach | Jan. 12, 1943 |

OTHER REFERENCES

Scheibley et al., Jour. Am. Chem. Soc., vol. 62, 840-1 (1940), Pat. Office Library.

Certificate of Correction

Patent No. 2,422,166. June 10, 1947.

JAMES KENNETH DIXON ET AL.

It is hereby certified that errors appear in the printed specification of the above number patent requiring correction as follows: Column 3, line 11, before the word "both" insert *by*; column 4, line 18, after the syllable "ide" strike out the hyphen and words "-cerium oxide"; column 6, line 56, after "rapidly" insert *enough*; column 8, line 15, after "paraffins" insert *having*; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*